Sept. 8, 1959   D. B. LE MAY ET AL   2,902,836
REGENERATIVE AIR CONDITIONING SYSTEM WITH
BLEED CONSERVATION CONTROL
Filed March 29, 1957
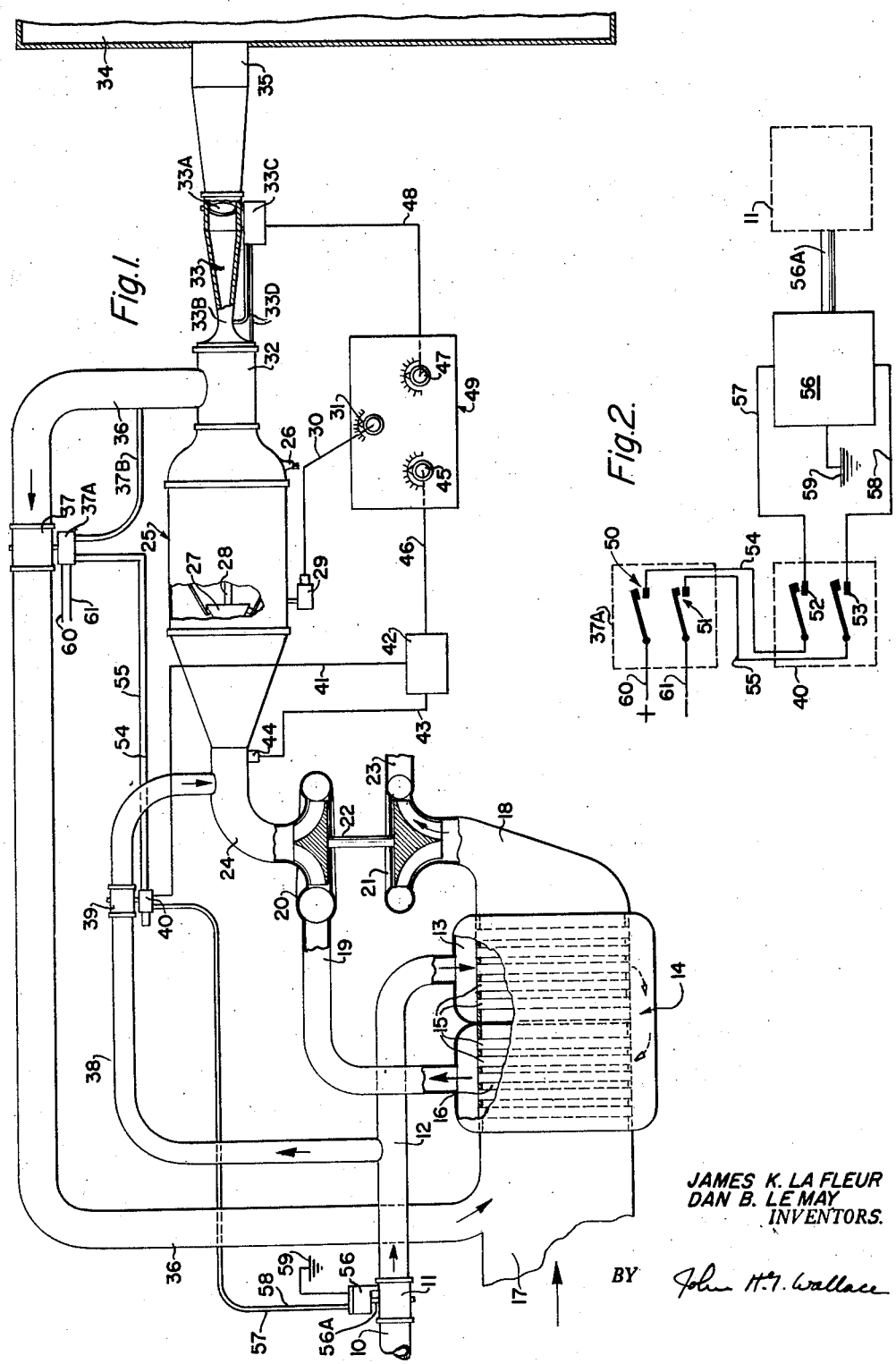
JAMES K. LA FLEUR
DAN B. LE MAY
INVENTORS.
BY John H. J. Wallace

United States Patent Office 2,902,836
Patented Sept. 8, 1959

2,902,836

REGENERATIVE AIR CONDITIONING SYSTEM WITH BLEED CONSERVATION CONTROL

Dan B. Le May and James K. La Fleur, Palos Verdes Estates, Calif., assignors to The Garrett Corporation, Los Angeles, Calif., a corporation of California Application March 29, 1957, Serial No. 649,481

13 Claims. (Cl. 62—172)

This invention relates generally to air conditioning systems and more especially to means for controlling and conserving the flow of bleed air for a regenerative air cycle air conditioning system.

It is common practice to utilize an air cycle air contitioning system to condition the air introduced into an enclosure, such as an aircraft cabin. Such systems generally include, among other things, an air-to-air heat exchanger and an expansion turbine. In the so-called "simple" system, for example, the high pressure conditioning bleed air is passed once through a heat exchanger in heat transfer relation to a coolant flowing in the other passage, is passed through an expansion turbine, and is then ducted to the enclosure. One type of regenerative air cycle air conditioning system is a modified form of the simple system wherein means including a regenerative passage are provided for conducting a portion of the conditioning air from the duct downstream of the expansion turbine to the heat exchanger coolant air passage. The air that flows through the regenerative passage performs two functions: it maintains the turbine efficiently by keeping the turbine flow high, and it artificially reduces the temperature of the heat sink, thereby reducing the temperature of the conditioning air at the turbine inlet. Thus, in such a regenerative air cycle air conditioning system it is possible to decrease the temperature of the turbine discharge air by conducting the excess expanded air, that is, that portion not needed for delivery to the enclosure, through the regenerative passage to the heat exchanger coolant air passage.

It is therefore an object of the invention to provide controls for a regenerative air cycle air conditioning system that function, when low temperatures are selected for delivery to the enclosure, to deliver a flow of bleed air to the system in excess of the flow required for delivery to the enclosure and to pass the excess expanded air through the regenerative passage.

It is a further object of the invention to provide a bleed conservation control for a regenerative air cycle air conditioning system that conserves bleed air by delivering excess bleed air to the system only when it is required to reduce the temperature of the expanded air.

It is customary to provide a by-pass duct in the regenerative air cycle air conditioning system for conducting hot high pressure bleed air from a point upstream of the heat exchanger inlet to a point downstream of the expansion turbine outlet. Flow through the by-pass duct normally is controlled by a by-pass valve which is actuated in response to signals from a temperature controller. The hot air flowing through the by-pass duct functions to raise the temperature of the air at the turbine outlet to the selected level. Since the flow through the by-pass duct and the flow through the regenerative passage perform conflicting functions, it is evident that it would be uneconomical to permit flow through both passages simultaneously.

It is therefore another object of the invention to provide a bleed conservation control for a regenerative air cycle air conditioning system that functions when air is flowing simultaneously through the regenerative passage and the by-pass duct to decrease the flow of bleed air to the system.

It is a still further object of the invention to provide a bleed conservation control for a regenerative air cycle air conditioning system that functions to maintain a constant flow of bleed air to the system when air is flowing through either the by-pass duct or the regenerative passage.

It is still another object of the invention to provide a bleed conservation control for a regenerative air cycle air conditioning system that functions to increase the flow of bleed air to the system when flow through both the turbine by-pass duct and the regenerative passage is shut off.

Other and further objects of the present invention will become apparent from the disclosure in the following detailed specification, appended claims, and the accompanying drawing wherein:

Figure 1 is a schematic representation of a regenerative air conditioning system having a regenerative passage and a turbine by-pass duct and including the controls embodying the features of this invention;

Figure 2 is a schematic wiring diagram for the bleed conservation control of the subject invention.

Referring to the drawing, there is shown in Fig. 1 a regenerative air conditioning system having a duct 10 through which a supply of high pressure bleed air to be conditioned in the system is conducted from a source such as a compressor, not shown. A bleed air shutoff and pressure regulating valve 11 is installed in the duct 10 and the flow of high pressure bleed air through the valve is controlled and modulated in the manner hereinafter described.

The valve 11 is connected by a duct 12 to a first passage 13 of a heat exchanger 14, which is illustrated as being of double pass construction. The passage 13 is formed of a plurality of fluid passages which may be of any convenient shape or form but which, for purposes of illustration, are shown as tubes 15. The heat exchanger 14 is provided with a second passage 16 having an inlet 17 and an outlet 18 for supplying coolant fluid, such as ambient atmosphere, in heat exchange relation to the high pressure fluid in the first passage 13.

The first passage 13 is connected by a duct 19 to an energy converting means, which in this instance consists of an expansion turbine 20, by which energy of the conditioning air is converted into mechanical energy and the conditioning air is further cooled. The turbine 20 is connected with a fan 21 by means of a shaft 22 and the energy recovered from the turbine is used to drive the fan. The fan 21 is positioned within the outlet 18 and serves to induce or aid the flow of the coolant fluid through the inlet 17, the second passage 16, and the outlet 18. The coolant fluid is discharged through a discharge duct 23 to a region of lower pressure, such as ambient atmosphere. The outlet of the expansion turbine 20 is connected by a duct 24 to a water separator, shown generally at 25, which is utilized to remove a portion of the entrained moisture which may be present in the turbine discharge air. The water separator may be any type well-known in the art wherein the moisture is coalesced, collected and removed from the separator by means such as a drain valve 26. A by-pass and pressure relief valve 27 is positioned within the water separator 25, the primary function of the valve being to relieve pressure in duct 24 in the event of icing of the water separator. However, in the event that it is desired to pass moist air through the regenerative loop in the manner hereinafter described, the valve 27 is arranged to be positively opened by a positioning rod 28 operatively connected to an actuator 29 which is electrically connected by a circuit 30 to a switch 31.

The water separator 25 discharges into a duct 32 which leads to a flow restricting means, such as a flow control valve 33, and the latter is connected to a pressurized enclosure 34 by a duct 35. The flow control valve 33 may be any suitable type of flow control valve well known in the art. It may, for example, include a butterfly member 33A, a pressure measuring venturi 33B, a pneumatic actuator 33C and pressure sensing conduits 33D, and functions to control the flow of air through the duct 35 at a predetermined value. The enclosure 34 is thus provided with a regulated source of air under pressure and may be provided with pressure regulating mechanism, not shown, for controlling the pressure therein in accordance with a preselected schedule.

A duct 36, connected at one end to the duct 32, is connected at its other end to the inlet 17 of the second passage 16 of the heat exchanger 14. The duct 36 may be termed a regenerative passage and is provided with a valve 37 of any suitable type well known in the art for controlling the flow of air therethrough in the manner hereinafter described. The valve 37 is connected to and operated by a pressure responsive means 37A which senses pressure in ducts 32 and 36 through a conduit 37B.

A by-pass duct 38, for conducting hot high pressure bleed air around the heat exchanger 14 and the expansion turbine 20, is connected at one end to the duct 12 upstream of the heat exchanger 14 and at its other end to the duct 24 downstream of the expansion turbine 20. Flow of air through duct 38 is controlled by a by-pass valve 39 which is operatively connected to a reversible electric motor indicated generally at 40. The motor 40 is connected by an electric circuit 41 with a temperature regulator 42 which may be of any type well-known in the art. The temperature regulator 42 is connected by a circuit 43 to a temperature pickup 44 located in the duct 24 and controls the operation of the motor 40, and hence the positioning of the valve 39 in accordance with the temperature of the air at the temperature pickup. It is to be understood, however, that the temperature pickup 44 may alternately be located in other locations such as, for example, the enclosure 34 or the duct 32 adjacent to the outlet of the water separator. A temperature selector 45 connected to the temperature regulator 42 by a circuit 46, and a flow selector 47 connected to the flow control valve 33 by a circuit 48 are located in any position that is readily accessible such as a control panel 49. The flow and temperature selectors permit the operator to independently set both flow and temperature.

The air conditioning system is provided with a bleed conservation control, shown schematically in Fig. 2, wherein the pressure responsive means 37A is provided with a switch 50 which makes a circuit when the valve 37 is in the slightly open position and a switch 51 which makes a circuit when the valve is closed. The motor 40 likewise is provided with a switch 52 which makes a circuit when the by-pass valve 39 is in the slightly open position and a switch 53 which makes a circuit when the valve 39 is closed. A conductor 54 connects the switches 50 and 52 and the switches 51 and 53 are connected by a conductor 55.

A reversible electric motor 56 operatively connected by means of a shaft 56A to the pressure regulating valve 11, has a conductor 57 connected to the switch 52 and a conductor 58 connected to the switch 53. A ground 59 is provided for the electric motor 56. When both the by-pass valve 39 and the pressure regulating valve 37 are slightly open, a circuit is completed from a power connection 60 through switch 50, conductor 54, switch 52 and conductor 57 to actuate the motor 56 and rotate shaft 56A in a direction to move the valve 11 toward closed position. When both the by-pass valve 39 and the pressure regulating valve 37 are closed, a circuit is completed from a power connection 61 through switch 51, conductor 55, switch 53 and conductor 58 to actuate the motor 56 and rotate shaft 56A in a direction to move the valve 11 in the opening direction. There is a dead band between the operating points of the two switches on each of the valves. The valves 37 and 39 are in the dead band position when they are between the closed position and the slightly open position. When either of the valves are in the dead band position, the motor 56 is inactive and the setting of valve 11 is maintained.

The system is inoperative when the air flow selector 47 is set on zero flow position. Prior to initiating operation of the system, the temperature selector 45 is set for the temperature desired at the temperature pickup 44. Delivery of the air to the enclosure may be initiated by moving the flow selector 47 from zero flow position to the desired delivery flow. The initial actuation of the flow selector automatically permits high pressure conditioning bleed air to flow through valve 11 and duct 12 to the tubes 15 in the heat exchanger 14 where the conditioning air is cooled by the coolant air passing in heat exchange relation in passage 16. From the heat exchanger the conditioning air passes to the expansion turbine 20 where the air is further cooled by expansion and the extraction of work energy. Energy recovered from the turbine 20 is delivered to the shaft 22 and utilized to drive the fan 21 to induce or aid the coolant air flow through the passage 16.

Both the valve 37 in the regenerative passage and the by-pass valve 39 are maintained in the closed position when the system is inoperative. The valve 39 remains in the closed position and all the conditioning air is directed through the heat exchanger 14 and the expansion turbine 20 as long as the temperature of the conditioning air at the temperature pickup 44 is above the temperature selected on the temperature selector 45. However, when the temperature of the conditioning air at the temperature pickup 44 falls below the temperature set on the temperature selector 45, the by-pass valve 39 is moved in the opening direction by the motor 40 acting under the control of the temperature regulator 42 so that a portion of the conditioning bleed air is passed through the by-pass duct 38 to mix in the duct 24 with the air discharged from the expansion turbine 20.

The expanded conditioning air, or the mixture of expanded air and by-passed air, in duct 24 is conducted to the water separator 25 wherein the moisture in the air is coalesced, collected and removed by means of the drain valve 26. In the event the flow through the water separator is impeded, the pressure of the air in the duct 24 is increased. This increased pressure, acting on the upstream face of valve 27, opens the valve to permit the conditioning air to by-pass the coalescing means and flow directly to the outlet of the separator. If it is desired to supply moist air to the regenerative passage 36, or to the enclosure 34, when the valve 27 is in the closed position, the switch 31 is set to energize the actuator 29 to move the valve 27 in the opening direction.

In operation, the volume of bleed air supplied to the system through the valve 11 is controlled or modulated as hereinafter described. The valve 37 in the regenerative passage 36 is held in the closed position when the volume of the conditioning air admitted to the system through valve 11 is less than the volume selected by the flow selector 47 for delivery through flow control valve 33. When the by-pass valve 39 and the valve 37 are both closed, a circuit is formed from the power connector 61 through the switch 51, the conductor 55, the switch 53 and the conductor 58 to the motor 56. The motor is thus energized to move the valve 11 in the opening direction to increase the flow of bleed air to the system and thereby increase the level of the regulated pressure.

So long as the valves 37 and 39 both remain in the closed position, the valve 11 is continuously moved in the opening direction by the motor 56 until the volume of air delivered to the system through valve 11 is greater than the volume of air flowing through the flow control valve 33 and the pressure created by the excess air in the duct 32 is transmitted through the conduit 37B to actuate the pressure responsive means 37A and move the valve 37 in the opening direction. When the valve 37 is moved to the dead band between the closed position and the slightly open position, the circuit from the power source to the motor 56 is broken so that the motor is inactivated and the setting of valve 11 is maintained. When the valve 37 is opened, the excess air in the system, that is the difference between the volume of air selected for delivery through the flow valve 33 and the volume of bleed air flowing to the system through valve 11, is conducted through the regenerative passage 36 to the coolant air inlet 17 of the heat exchanger 14 where it aids in further cooling the conditioning air in passage 13. The pressure responsive means 37A may be set to maintain the pressure of the air downstream of the expansion turbine 20 at the value required to maintain the desired turbine pressure ratio.

The valve 39 in the by-pass duct 38 is opened when the temperature of the air at the temperature pickup 44 falls below the temperature set on the temperature selector 45. If the valve 39 is thus moved from the closed position to an open position while the valve 37 in the regenerative passage is in the closed position, the circuit from the power source through connector 61, switch 51, conductor 55, switch 53 and conductor 58 to the motor 56 is broken when the valve 39 enters the dead band between the closed position and the slightly open position and movement of the valve 11 toward the open position is arrested, thus conserving flow of bleed air.

If the valve 39 is moved from the closed position to an open position while the valve 37 in the regenerative passage 36 is in the open position, a circuit is formed from the power connector 60 through the switch 50, the conductor 54, the switch 52 and the conductor 57 to the motor 56 to energize the motor so as to move the valve 11 toward the closed position, thereby decreasing the flow of bleed air through valve 11 and lowering the pressure level in duct 32. As the pressure level in duct 32 is lowered, the pressure responsive means 37A moves the valve 37 in the regenerative passage 36 toward the closed position thus preventing flow simultaneously through both the regenerative passage and the by-pass duct. When the valve 37 reaches the dead band between the closed position and the slightly open position, the switch 50 opens and the power circuit to the motor 56 is broken thereby inactivating the motor and arresting movement of the valve 11.

The above pressure resetting mechanism is set to operate slowly and it is, therefore, possible for the independent temperature control system to readjust the by-pass valve 39, and for the turbine discharge pressure regulating system to readjust at the same time. The action of the system will be in such a direction as to close one or both of the valves 37 and 39 when the two are indicated open. Bleed air, therefore, is never wasted but is used in excess of the delivery air flow rate only when necessary to reduce system discharge temperature. The system is especially adapted to deliver low flow and low temperatures to the enclosure since it is possible to deliver a flow of bleed air to the system in excess of the flow set for delivery to the enclosure and to pass the excess expanded air through the regenerative passage.

While the invention is described and has particular utility and use with an air cycle air conditioning system, such as may be utilized for conditioning the air introduced into an enclosure, it is to be understood that its utility is not limited thereto, but may be utilized in many other applications, as will be apparent to those skilled in the art.

We claim:
1. In a system for conditioning fluid supplied from a source to an enclosure: means for conducting fluid from said source to said enclosure; a bleed valve means for controlling the flow of fluid from said source to said conducting means; a cooler having first passage means positioned in said conducting means and second passage means arranged for the flow therethrough of a coolant in heat exchange relation to said first passage means for cooling said fluid; an expansion turbine in said conducting means for further cooling said fluid; pumping means driven by said expansion turbine for augmenting the flow of coolant through said second passage means of said cooler; flow control means for delivering a predetermined maximum flow of said fluid through said conducting means to said enclosure; and means for conducting the remainder of said fluid in said conducting means downstream of said expansion turbine to said second passage means of said cooler.

2. In a system for conditioning fluid supplied from a source to an enclosure; means for conducting fluid from said source to said enclosure; a bleed valve means for controlling the flow of fluid from said source to said conducting means; a cooler having first passage means positioned in said conducting means and second passage means arranged for the flow therethrough of a coolant in heat exchange relation to said first passage means for cooling said fluid; an expansion turbine in said conducting means for further cooling said fluid; pumping means driven by said expansion turbine for augmenting the flow of coolant through said second passage means of said cooler; flow control means for delivering a predetermined maximum flow of said fluid through said conducting means to said enclosure; and a regenerative passage for conducting the remainder of said fluid in said conducting means downstream of said expansion turbine to said second passage means of said cooler.

3. In a system for conditioning fluid supplied from a source to an enclosure: means for conducting fluid from said source to said enclosure; a bleed valve means for controlling the flow of fluid from said source to said conducting means; a cooler having first passage means positioned in said conducting means and second passage means arranged for the flow therethrough of a coolant in heat exchange relation to said first passage means for cooling said fluid; an expansion turbine in said conducting means for further cooling said fluid; pumping means driven by said expansion turbine for augmenting the flow of coolant through said second passage means of said cooler; flow control means for delivering a predetermined maximum flow of said fluid through said conducting means to said enclosure; a regenerative passage for conducting the remainder of said fluid in said conducting means downstream of said expansion turbine to said second passage means of said cooler; and pressure responsive valve means in said regenerative passage for maintaining a predetermined maximum pressure at the outlet of said expansion turbine.

4. In a system for conditioning fluid supplied from a source to an enclosure: means for conducting fluid from said source to said enclosure; a bleed valve means for controlling the flow of fluid from said source to said conducting means; a cooler having first passage means positioned in said conducting means and second passage means arranged for the flow therethrough of a coolant in heat exchange relation to said first passage means for cooling said fluid; an expansion turbine in said conducting means for further cooling said fluid; flow control means for delivering a predetermined maximum flow of said fluid through said conducting means to said enclosure; a regenerative passage for conducting the remainder of said fluid in said conducting means downstream of said expansion turbine to said second passage means of said cooler; pressure responsive valve means in said regenerative passage for maintaining a predetermined maximum pressure at the outlet of said expansion turbine; a by-pass duct for directing fluid in said conducting means around said first passage means of said cooler and said expansion turbine; and valve means in said by-pass duct for controlling the flow of fluid therethrough.

5. In a system for conditioning fluid supplied from a source to an enclosure: means for conducting fluid from said source to said enclosure; a bleed valve means for controlling the flow of fluid from said source to said conducting means; a cooler having first passage means positioned in said conducting means and second passage means arranged for the flow therethrough of a coolant in heat exchange relation to said first passage means for cooling said fluid; an expansion turbine in said conducting means for further cooling said fluid; flow control means for delivering a predetermined maximum flow of said fluid through said conducting means to said enclosure; a regenerative passage for conducting the remainder of said fluid in said conducting means downstream of said expansion turbine to said second passage means of said cooler; pressure responsive valve means in said regenerative passage for maintaining a predetermined maximum pressure at the outlet of said expansion turbine; a by-pass duct for directing fluid in said conducting means around said first passage means of said cooler and said expansion turbine; valve means in said by-pass duct for controlling the flow of fluid therethrough; and means for controlling said by-pass valve means including temperature responsive means responsive to the temperature of the fluid at a preselected point in said system.

6. In a system for conditioning fluid supplied from a source to an enclosure: means for conducting fluid from said source to said enclosure; a bleed valve means for controlling the flow of fluid from said source to said conducting means; a cooler having first passage means positioned in said conducting means and second passage means arranged for the flow therethrough of a coolant in heat exchange relation to said first passage means for cooling said fluid; an expansion turbine in said conducting means for further cooling said fluid; flow control means for delivering a predetermined maximum flow of said fluid through said conducting means to said enclosure; a regenerative passage for conducting the remainder of said fluid in said conducting means downstream of said expansion turbine to said second passage means of said cooler; pressure responsive valve means in said regenerative passage for maintaining a predetermined maximum pressure at the outlet of said expansion turbine; a by-pass duct for directing fluid in said conducting means around said first passage means of said cooler and said expansion turbine; valve means in said by-pass duct for controlling the flow of fluid therethrough; means for controlling said by-pass valve means including temperature responsive means responsive to the temperature of the fluid at a preselected point in said system; and control means for actuating said bleed valve means when the pressure responsive valve means in said regenerative passage and the by-pass valve means in said by-pass duct are both in open position or both in closed position.

7. In a system for conditioning fluid supplied from a source to an enclosure: means for conducting fluid from said source to said enclosure; a bleed valve means for controlling the flow of fluid from said source to said conducting means; a cooler having first passage means positioned in said conducting means and second passage means arranged for the flow therethrough of a coolant in heat exchange relation to said first passage means for cooling said fluid; an expansion turbine in said conducting means for further cooling said fluid; flow control means for delivering a predetermined maximum flow of said fluid through said conducting means to said enclosure; a regenerative passage for conducting the remainder of said fluid in said conducting means downstream of said expansion turbine to said second passage means of said cooler; pressure responsive valve means in said regenerative passage for maintaining a predetermined maximum pressure at the outlet of said expansion turbine; a by-pass duct for directing fluid in said conducting means around said first passage means of said cooler and said expansion turbine; valve means in said by-pass duct for controlling the flow of fluid therethrough; means for controlling said by-pass valve means including temperature responsive means responsive to the temperature of the fluid at a preselected point in said system; and control means for moving said bleed valve means in the closing direction when the pressure responsive valve means in said regenerative passage and the by-pass valve means in said by-pass duct are both in open or partially open position, and moving said bleed valve means in the opening direction when the pressure responsive valve means in said regenerative passage and the by-pass valve means in said by-pass duct are both in closed position.

8. A system according to claim 7 wherein said control means comprises electric power means including an electric motor for actuating said bleed air valve means.

9. A system according to claim 8 wherein operation of said electric motor is controlled by switch means operatively mounted on said pressure responsive valve means and said by-pass valve means.

10. A system according to claim 9 wherein said electric motor is rendered inactive and the setting of said bleed valve means is maintained when either said pressure responsive valve means or said by-pass valve means is in a predetermined range between the closed position and the slightly open position.

11. A system according to claim 10 wherein a fan means operably connected to said expansion turbine is provided for augmenting the flow of coolant through said second passage of said cooler.

12. A system according to claim 11 wherein a water separator having a by-pass valve is provided in said conducting means downstream of said expansion turbine for removing entrained moisture.

13. In a system for conditioning fluid supplied from a source to an enclosure: means for conducting fluid from said source to said enclosure; a cooler having first passage means positioned in said conducting means and second passage means arranged for the flow therethrough of a coolant in heat exchange relation to said first passage means for cooling said fluid; expansion means in said conducting means for further cooling said fluid; flow control means for delivering a predetermined maximum flow of said fluid through said conducting means to said enclosure; a regenerative passage for conducting the remainder of said fluid in said conducting means downstream of said expansion means to said second passage of said cooler; valve means in said regenerative passage for controlling the flow of fluid therethrough; a by-pass duct for directing fluid in said conducting means around said first passage means of said cooler and said expansion means; valve means in said by-pass duct for controlling the flow of fluid therethrough; a bleed valve means for controlling the flow of fluid from said source to said conducting means; and control means for actuating said bleed valve means when the valve means in said regenerative passage and the valve means in said by-pass duct are both in the open position or both in the closed position.

References Cited in the file of this patent

UNITED STATES PATENTS

| | | |
|---|---|---|
| 2,485,590 | Green | Oct. 25, 1949 |
| 2,693,088 | Green | Nov. 2, 1954 |